Oct. 10, 1950   G. BERG   2,524,876
COMBER BOARD FOR LOOMS
Filed July 17, 1946   2 Sheets-Sheet 1
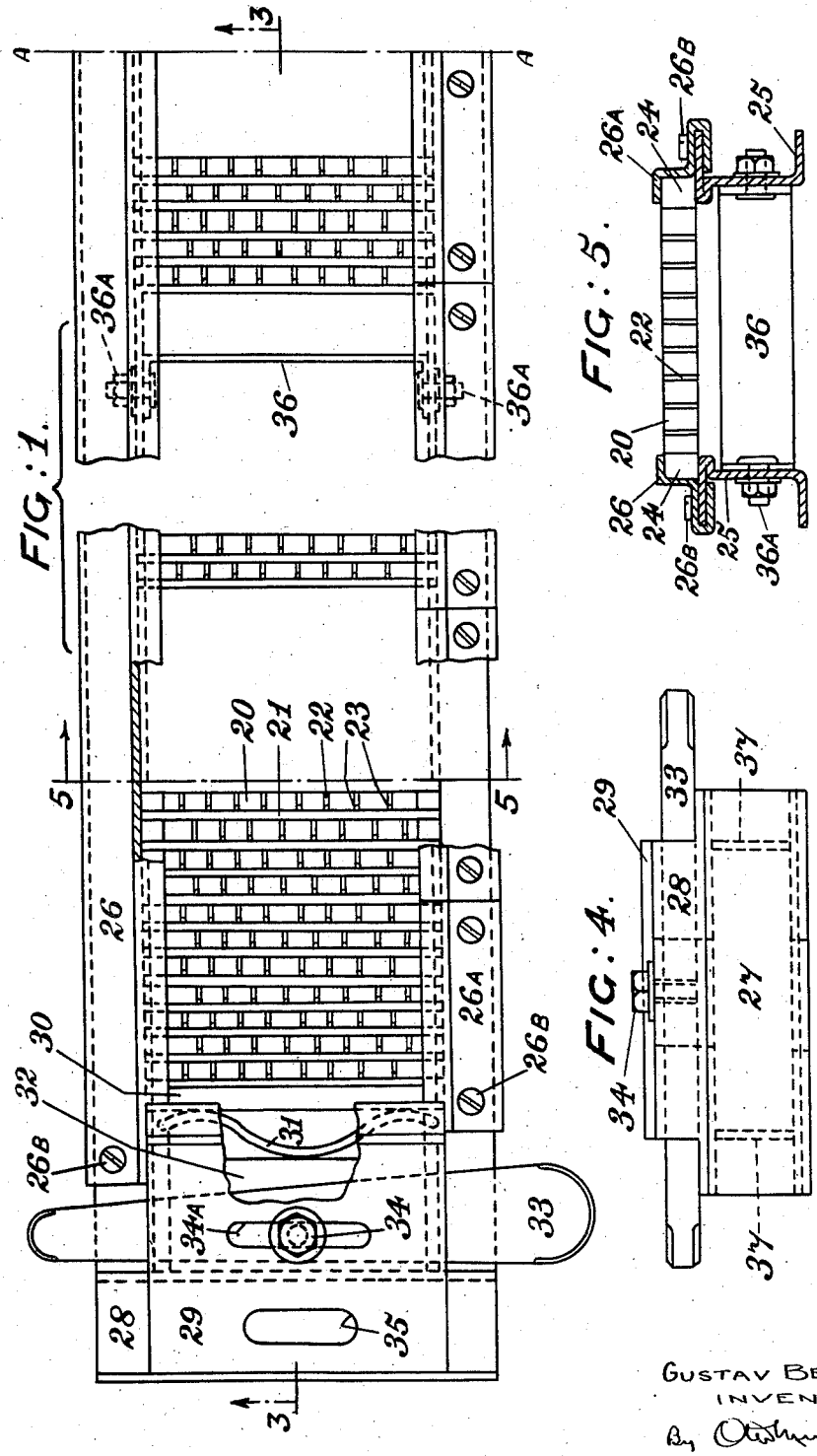
GUSTAV BERG
INVENTOR
his ATTY.

Oct. 10, 1950  G. BERG  2,524,876
COMBER BOARD FOR LOOMS
Filed July 17, 1946  2 Sheets-Sheet 2
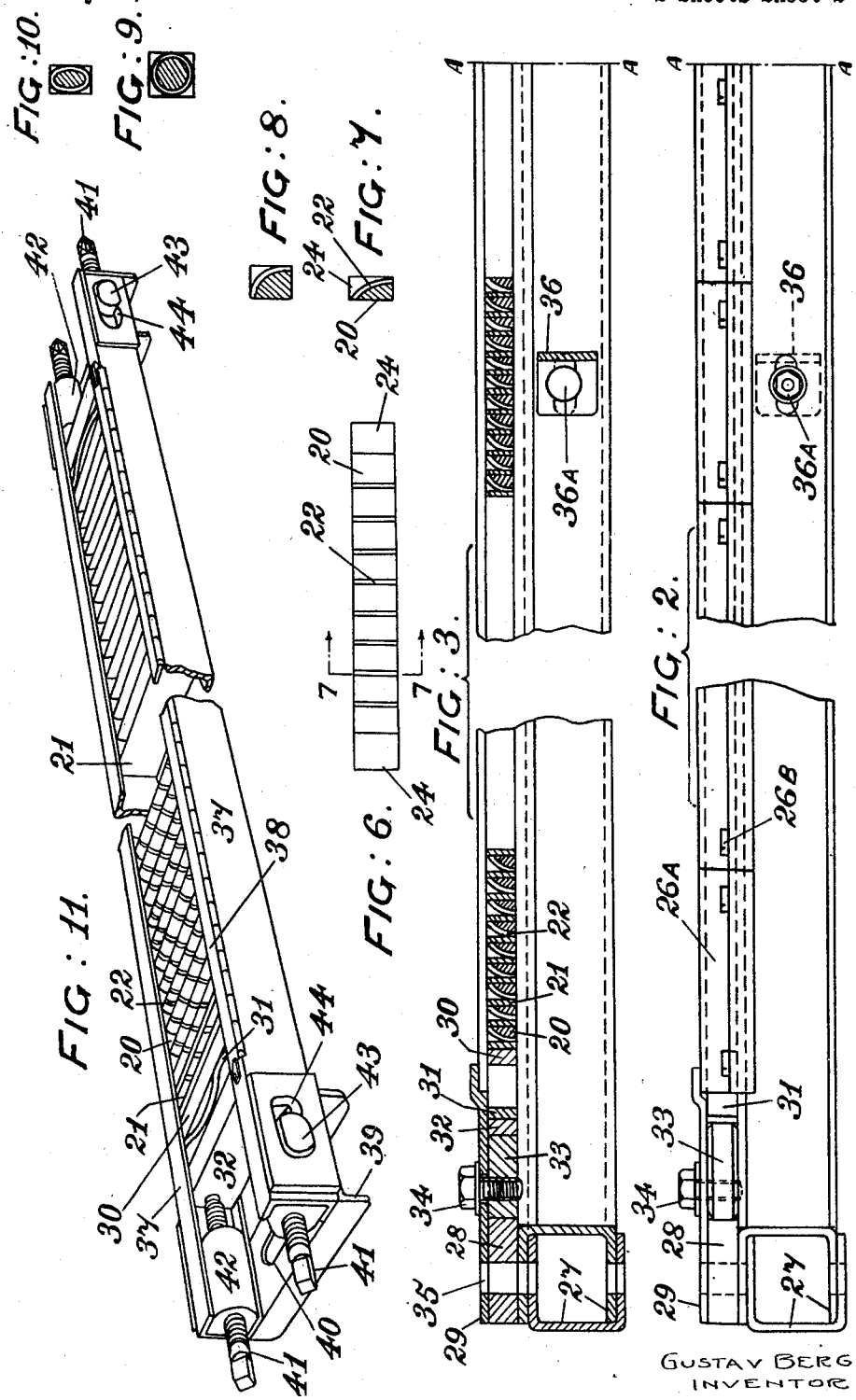

Patented Oct. 10, 1950

2,524,876

UNITED STATES PATENT OFFICE 2,524,876

COMBER BOARD FOR LOOMS

Gustav Berg, Glasgow, Scotland

Application July 17, 1946, Serial No. 684,339
In Great Britain February 15, 1945

5 Claims. (Cl. 139—86)

This invention relates to comber boards; that is to say, loom components used hitherto as boards formed or provided with a multiplicity of small guides through which work the cords of a harness that controls the shedding of the warps in the weaving of a patterned fabric.

An object of the invention is to provide a built-up comber board comprising a series of juxtaposed cross pieces, each of which co-operates with another to provide a row of cord guides.

Another object is to provide a rigid frame for supporting the cross pieces and holding them in proper co-relationship.

Another object is to provide in a built-up comber board a series of cross pieces which function as distance pieces, or spacers, or fillers, and which are hereinafter specifically referred to as "distance pieces", and these distance pieces are arranged to co-operate with grooved members to form the required rows of cord guides, the thickness of such distance pieces to determine the spacing, or pitching, of the guide rows.

Another object is to have distance pieces of different thicknesses available so that by selecting distance pieces of appropriate thickness one can adjust the spacing of the guide rows.

Other objects of the invention will be apparent from the following specification and the appended claims.

Examples embodying the invention will now be described with reference to the accompanying drawings, in which:

Fig. 1 is a plan of half of a built-up comber board, parts thereof being broken away and parts being omitted at places for clearness. Fig. 2 is a side elevation corresponding to Fig. 1, and Fig. 3 is a section on the line 3—3 thereof. Fig. 4 is an end elevation corresponding to Fig. 1 and Fig. 5 is a section on the line 5—5. Fig. 6 is an elevation of a cross-piece shaped with grooves which form cord guides, Fig. 6 being drawn to a larger scale than Figs. 1 to 5. Fig. 7 is a section on the line 7—7 of Fig. 6.

Figs. 8, 9 and 10 are views similar to Fig. 7 but each shows a different sectional form which the crosspiece according to Fig. 6 may have.

Fig. 11 is a perspective view of an alternative built-up comber board.

In the example shown by Figs. 1 to 7, the built-up comber board includes a long series of cross-pieces consisting of grooved slatlike members 20 and distance pieces 21, there being a distance piece at one side of each member 20, as best shown in Figs. 1 and 3. In the example, as Fig. 7 shows, each member 20 has a rounded upwardly inclined side face and this face is cut with equi-spaced grooves or half-holes 22. Each distance piece is a thin flat-faced member. The grooves in each member 20 cooperate with the adjacent distance piece 21 to form a row of semi-circular guide holes 23 (shown only in Fig. 1) for a number of harness cords (not shown). Each of the members 20 ends in two rectangular-section heads 24, the depth of which is the same as that of the ends of the distance pieces 21.

The cross pieces 20 and 21 are arranged in a rigid frame including composite longitudinals each consisting of a base component 25 and an angle component 26 or 26A. The components 26 and 26A are attached by screws 26B to the associated component 25. The component 26A at one side is composed of detachable end-to-end sections. The components 25 and 26 or 26A of each longitudinal form between them a channel (shown best in Fig. 5) which extends without interruption from end to end of the longitudinal and in which the ends of the cross pieces 20 and 21 snugly fit, being slidable along the channel and into or out of it. The frame also includes end transversals each consisting of a box-section bridge 27 secured across the ends of the longitudinal components 25, a fixed abutment block 28 secured upon the bridge 27 and a top cover plate 29 which provides a recess beyond the ends of the longitudinal components 26, 26A. A pressure pad, consisting of a slidable cross bar 30 and a blade spring 31, is applied to each end of the series of cross pieces 20 and 21, said pad bearing upon the outermost pieces of the series and pressing all the pieces rigidly against one another. Each spring 31 bears against an adjustable abutment 32 which is fitted with the spring in the aforesaid recess provided by the cover plate 29 of the associated end transversal. Adjustment of the abutment 32 is effected by means of a transverse wedge 33 which is interposed between the fixed and adjustable abutments 28 and 32 and is locked in position by a set screw 34 extending through a slot 34A in the cover plate 29 and screwed into the wedge.

The frame structure is rendered more secure by transverse stays 36 adjustably secured at their ends by bolts 36A to the longitudinal components 25, one only of such stays being shown in the drawings.

In Figs. 1 to 3 of the drawings, the built-up comber board is shown only at one side of its middle line A, and only a few of the cross pieces 20 and 21 are shown. It will however be understood that the other half of the comber board is the same as the half shown and that in use of the comber board there will be an unbroken series of cross pieces from the pressure-pad bar 30 at one end to a similar bar at the other end.

In designing the comber board, the cross pieces 20 and 21 can each be of standardised form and can readily be made of cheap light mouldable material such as a thermo-setting plastic composition.

The parts of the comber board can be assembled in position on an existing harness of cords or can be dismantled wholly or in part without need for threading or re-threading the cords. Should it be desired to insert new cords, or to adjust the spacing between the rows of guide holes 23, in each instance the desired result can be attained by slackening the wedges 33 and removing any of the sections of the component 26A from the frame, so that any one or more of the cross pieces 20 and 21 can be removed or replaced, and thereafter carrying out the desired change or changes.

During assembly or change involving detachment of the component 26A for insertion or removal of the cross pieces 20 and 21, the components 25 and the component 26 serve to hold the cross pieces appropriately in position.

The longitudinals may be composed of a number of lengths connectible together end-to-end without interrupting the continuity of the channels containing the ends of the pieces 20 and 21. In that event the length of the comber board while assembled on a harness can be changed by dismantling the board parts, removing one or more lengths from each longitudinal and thereafter re-assembling the retained parts, all without need for unthreading or re-threading the cords through the guide holes 23.

The end transversals each have a slot 35 by virtue of which the comber board can be adjustably secured to its supporting means in a loom.

Although as shown each grooved member 20 cooperates with a distance piece 21 to form a row of guide holes 23, one may use grooved members only; and in that event the arrangement may be such that the grooved face of one member cooperates with the ungrooved back of the other to form a row of semi-circular holes, or such that the grooved faces of both members cooperate to form a row of circular holes.

Thus it will be manifest that the invention provides a built-up comber board comprising a longitudinal series of juxtaposed cross pieces 20 formed with transverse rows of what are in effect part holes 22 and each co-operating with another cross piece 20 or 21 to provide by virtue of said part holes a transverse row of cord guides 23, and a frame holding the ends of the cross pieces and maintaining the cross-pieces in proper co-relationship. It will be noted that this co-relationship is maintained by pressure applied lengthwise of the comber board against the abutments 32 at opposite ends through the spring means 31, so that the cross pieces 20 and 21 are held tightly side by side under such pressure. The longitudinals 26, 26A and the transversals constitute a rigid frame in which the cross pieces 20 and 21 are freely slidable and into or out of which the cross pieces are freely insertable or removable.

The grooved members may have any of various sections, as Figs. 8, 9 and 10 show. As shown by Fig. 8, the cross-sectional form may be thicker than that of the members 20 shown in Figs. 1 to 7. As shown by Figs. 9 and 10, the cross-sectional form may be round, being circular in Fig. 9 and oval in Fig. 10, members of such cross-sectional form being double-sided, so that each forms two rows of guide holes in co-operation with either two adjacent grooved members of similar cross-section or two adjacent distance pieces such as the pieces 21.

In each instance (as will be understood best by reference to Fig. 3) the grooves 22, being formed in a curved side of each member 20, themselves curve upwardly away from the adjacent cross-piece (be it a distance piece 21 or another grooved member 20). Thus each guide 22 provided for a jacquard cord is upwardly widened or divergent. With grooved members according to Figs. 7 and 8, the upward widening extends throughout the whole depth of the members. With grooved members, according to Figs. 9 and 10 the upward widening extends throughout half the depth of the members. That is to say, in every case the upward widening of the thread guide 22 extends for at least half the depth of the grooved member. By virtue of this substantial widening, the guide 22 allows adequate freedom for a substantial inclination from vertical of the jacquard cord. As is well known, the harness cords of a jacquard or like pattern-selecting apparatus rise vertically from the comber board at the middle of the length thereof, whereas the cords nearer the end of the board rise at an inwards inclination, the inclination from vertical being greatest at the ends of the comber board. It will be appreciated that the upwardly widening cord-guiding holes 23 defined by the curved grooves 22 fully allow for even the greatest practicable inclination of the harness cords, without fear of the cords rubbing against and becoming worn at the tops of the cord guides.

With reference to Fig. 11, the built-up comber board therein shown has cross pieces 20 and 21 substantially similar to those shown in Figs. 1 to 7, although for clearness the pieces 20 are omitted from the right-hand end portion of the board and most of the pieces 21 are omitted from the left-hand end portion. The board shown comprises a frame including longitudinals 37 both of them of channel section and one of them having a hinged flap 38 as the top element of its channel. The end transversals of the frame each comprise a bridge 39 which is rigidly secured to the longitudinals. Each bridge has a slot 40 by virtue of which the comber board can be adjustably secured to supporting means. As in the previous example the cross pieces 20 and 21 are pressed rigidly together by pressure pads applied to opposite ends of the series, each pressure pad consisting of a slidable cross bar 30 and a blade spring 31 and each spring bearing against an adjustable abutment 32. In the present example, the parts 30, 31 and 32 fit slidably at their ends in the channels of the longitudinals, and each abutment 32 is held in place by adjustment screws 41 which are screwed through blocks 42 fitted to the longitudinals at the ends of the channels. The blocks may be rigidly fixed to the longitudinals or may be adjustable, as shown, by providing a screw-and-slot attachment 43, 44 between each block 42 and the associated longitudinal.

In use of a comber board such as shown in Fig. 11, in order to make adjustments in regard to the number or spacing of the grooved members 20, with or without the distance pieces 21, it is necessary simply to relieve the pressure on the series of cross pieces by unscrewing the screws 41 at one or each end of the board and temporarily lifting the hinged flap 38, thus permitting removal, insertion or interchange of cross pieces.

In the foregoing specification and in the following claims the expression "cross piece" has been used as a generic term the meaning of which includes both a grooved member (such as the members shown in Figs. 6 to 10) and a distance piece (such as any of the distance pieces 21).

I claim:

1. A built-up comber board comprising a series of juxtaposed cross pieces having sides formed with grooves and co-operating with one another to make of said grooves a row of cord guides, a frame in which said cross pieces are slidably supported at their ends, a pressure pad incorporated in at least one end of said frame, spring means co-operating with said pressure pad to hold said cross pieces in proper co-relationship, and means for adjusting the holding pressure applied through said pad and spring means to said cross pieces.

2. A built-up comber board comprising a series of juxtaposed cross pieces having sides formed with grooves and co-operating with one another to make of said grooves a row of cord guides, a frame in which said cross pieces are slidably supported at their ends, pressure pads incorporated in opposite ends of said frame, spring means interposed between at least one of said pressure pads and said series of cross pieces in order to hold said cross pieces in proper co-relationship, and means applied to at least one of said pressure pads for adjusting it lengthwise of the frame in order to adjust the holding pressure exerted through said spring means on said cross pieces.

3. A built-up comber board as claimed by claim 2 in which the series of juxtaposed cross pieces comprises cross pieces each formed with grooves down one side and other cross pieces interposed as spacers between adjacent grooved cross pieces, said spacers co-operating with said grooves to form rows of cord guides.

4. A built-up comber board comprising a series of juxtaposed cross pieces, each of which cross pieces co-operates with another cross piece to provide a row of cord guides, a frame supporting the cross pieces, a pressure pad incorporated in at least one end of said frame, spring means co-operating with said pressure pad to hold said cross pieces in proper co-relationship, and means for adjusting the holding pressure applied through said pad and spring means to said cross pieces.

5. A built-up comber board comprising a series of juxtaposed cross pieces, each of which cross pieces co-operates with another cross piece to provide a row of cord guides, a frame supporting the cross pieces, pressure pads incorporated in opposite ends of said frame, spring means interposed between at least one of said pressure pads and said series of cross pieces in order to hold said cross pieces in proper co-relationship, and means applied to at least one of said pressure pads for adjusting it lengthwise of the frame in order to adjust the holding pressure exerted through said spring means on said cross pieces.

GUSTAV BERG.

REFERENCES CITED

The following references are of record in the file of this patent:

UNITED STATES PATENTS

| Number | Name | Date |
|--------|------|------|
| 373,151 | Northrup | Nov. 15, 1887 |
| 574,382 | Brauch | Jan. 5, 1897 |
| 1,150,396 | Seckler | Aug. 17, 1915 |